(12) United States Patent
Hiraga et al.

(10) Patent No.: US 6,794,487 B2
(45) Date of Patent: Sep. 21, 2004

(54) METHOD FOR STABILIZING FLUORINE-CONTAINING POLYMER

(75) Inventors: Yoshiyuki Hiraga, Settsu (JP); Tomohisa Noda, Settsu (JP); Hiroyuki Imanishi, Settsu (JP); Satoshi Komatsu, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 10/417,158

(22) Filed: Apr. 17, 2003

(65) Prior Publication Data

US 2003/0208005 A1 Nov. 6, 2003

Related U.S. Application Data

(62) Division of application No. 10/061,203, filed on Feb. 4, 2002, now Pat. No. 6,664,337, which is a division of application No. 09/254,510, filed as application No. PCT/JP97/03098 on Sep. 4, 1997, now abandoned.

(30) Foreign Application Priority Data

Sep. 9, 1996 (JP) .............................................. 8-237720

(51) Int. Cl.⁷ .................................................. C08F 6/26
(52) U.S. Cl. ........................ 528/481; 528/499; 528/500
(58) Field of Search ................................. 528/481, 499, 528/500

(56) References Cited

U.S. PATENT DOCUMENTS

| | | |
|---|---|---|
| 3,085,083 A | 4/1963 | Schreyer et al. |
| 3,674,758 A | 7/1972 | Carlson |
| 4,626,587 A | 12/1986 | Morgan et al. |
| 4,743,658 A | 5/1988 | Imbalzano et al. |
| 5,045,605 A | 9/1991 | Buckmaster |
| 5,789,509 A | 8/1998 | Schmiegel |
| 5,874,523 A | 2/1999 | Schmiegel |
| 6,451,962 B1 * | 9/2002 | Hiraga et al. ................ 528/480 |

FOREIGN PATENT DOCUMENTS

| | | |
|---|---|---|
| JP | B2-4-83 | 1/1992 |
| JP | B2-5-10204 | 2/1993 |

* cited by examiner

*Primary Examiner*—Bernard Lipman
(74) *Attorney, Agent, or Firm*—Birch, Stewart, Kolasch & Birch, LLP

(57) ABSTRACT

A melt-processable fluorine-containing polymer is melt kneaded with a kneader which has a residence time of at least 10 minutes, a usable volume ratio (usable space in a container/space in a container) of larger than 0.3, and a power factor K of less than 8000, the power factor K being represented by the formula: $K=Pv/\mu/n^2$ in which Pv is a power requirement per unit volume ($W/m^3$), $\mu$ is a melt viscosity (Pa.s), and n is a rotation speed (rps), to effectively remove terminal groups and bonds in the backbones, which are unstable during melt kneading, from the melt-processable fluorine-containing polymer, and obtain a colorless fluorine-containing polymer.

5 Claims, No Drawings

METHOD FOR STABILIZING FLUORINE-CONTAINING POLYMER

This application is a divisional of application Ser. No. 10/061,203, filed on Feb. 4, 2002, now U.S. Pat. No. 6,664,337 which is a divisional under 37 C.F.R. §1.53(b) of prior application Ser. No. 09/254,510 filed on Mar. 9, 1999, now abandoned, for which priority is claimed under 35 U.S.C. §120. Application Ser. No. 10/061,203 is the national phase of PCT International Application No. PCT/JP97/03098 filed on Sep. 4, 1997 under 35 U.S.C. §371. The entire contents of each of the above-identified applications are hereby incorporated by reference. This application also claims priority of Application No. 237720/1996 filed in Japan on Sep. 9, 1996 under 35 U.S.C. §119.

FIELD OF THE INVENTION

The present invention relates to a method for stabilizing a fluorine-containing polymer. In particular, the present invention relates to a method for stabilizing a fluorine-containing polymer by treating a fluorine-containing polymer which has unstable chain ends and/or unstable bonds in the backbones under specific conditions.

PRIOR ART

In the case of, for example, emulsion copolymers of tetrafluoroethylene and hexafluoropropylene, bubbles or voids may be formed from volatile materials in products produced by melt processing. The volatile materials are generated from the unstable chain ends and unstable backbones of the polymers, when heat or shear force is applied to the polymers.

The kinds of unstable chain end groups vary with polymerization methods, and the kinds of polymerization initiators and chain transfer agents. For example, carboxylic acid terminal groups are formed, when a conventional persulfate salt (e.g. ammonium persulfate, potassium persulfate, etc.) is used as a polymerization initiator in emulsion polymerization. It is known that such carboxylic acid terminal groups are the sources for volatile materials in the melt processing. Depending on the conditions in the melt processing, groups such as olefinic groups (—CF=CF$_2$), acid fluoride groups (—COF) and the like are formed at the chain ends. These end groups may cause bubbles or voids in the final products of the polymers.

Backbones which may generate volatile materials may be bonds between comonomers other than tetrafluoroethylene (TFE), as U.S. Pat. No. 4,626,587 describes. In the case of tetrafluoroethylene-hexafluoropropylene copolymers (FEP), the unstable bonds in the backbones are bonds between hexafluoropropylene monomers (HFP). This is confirmed form the fact that, when a gas generated by heating and melting FEP around 400° C. is analyzed, a molar ratio of HFP to TFE in the generated gas is about two times larger than that in the polymers.

U.S. Pat. No. 4,626,587 proposes the removal of unstable chain end groups and unstable bonds in the backbones, which may be the cause of bubbles or voids found in the final products of fluorine-containing polymers, by the application of a shear force with a twin-screw extruder. However, the use of a twin-screw extruder can remove the unstable bonds in the backbones because of the large shear force of the extruder, but hardly stabilizes the unstable end groups because of the too short residence time. In addition, it is very difficult to remove coloring which appears because of the severe melting conditions, and the residues of polymerization initiators or contamination. Thus, additional stabilization treatment such as fluorination with other equipment is necessary after the treatment with the twin-screw extruder. Furthermore, molded articles should be treated at a temperature lower than the melting point of the polymer, when the unstable end groups are stabilized after melt molding, since the shapes of the molded articles should be maintained.

SUMMARY OF THE INVENTION

An object of the present invention is to provide a method for effectively removing unstable end groups and unstable bonds in backbones from fluorine-containing polymers and also coloring, in the melt kneading step.

The above object can be achieved by a method for improving the thermal stability of a fluorine-containing polymer comprising melt kneading a melt-processable fluorine-containing polymer with a kneader which has a residence time of at least 10 minutes, a usable volume ratio (usable space in a container/space in a container) of larger than 0.3, and a power factor K of less than 8000, the power factor K being represented by the formula:

$$K=Pv/\mu/n^2$$

wherein Pv is a power requirement per unit volume (W/m$^3$), $\mu$ is a melt viscosity (Pa.s), and n is a rotation speed (rps).

DETAILED DESCRIPTION OF THE INVENTION

A kneader used in the method of the present invention is distinguished from the above twin-screw extruder in that the kneader has a longer residence time than the extruder, that is, the residence time is usually at least 10 minutes, preferably between 10 and 120 minutes, and that the structures (e.g. usable volume ratios, etc.) and the power factors are different between them.

The conventional twin-screw has a usable volume ratio (usable space in a container/space in a container) of 0.3 or less, while a kneader which is preferably used in the present invention, that is, a so-called "surface renewal type kneader" has a usable volume ratio of larger than 0.3, preferable at least 0.5. Herein, a usable space in a container means the space volume of a container in which paddles, a shaft, and the like are equipped, while a space in a container means a space volume of a container not having paddles, a shaft, or the like.

The twin-screw extruder has a power factor K, which is defined by the above formula, in the range between 8,000 and 12,000, while the surface renewal type kneader has a power factor of less than 8,000, often 7,000 or less. The surface renewal type kneader has self-cleaning properties, and high piston flow properties in continuous operation.

Typical examples of the surface renewal type kneaders include HVR, SCR and NEW-SCR (all manufactured by Mitsubishi Heavy Industries, Ltd.), BIBOLACK (manufactured by Sumitomo Heavy Machinery and Industries, Ltd.), HITACHI EYEGLASS-PADDLE POLYIMERIZER and HITACHI GATE-PADDLE POLYMERIZER (manufactured by Hitachi Ltd.), AP-MACHINE and NEW AP-MACHINE (manufactured by LIST), and the like.

Examples of the fluorine-containing polymers which are stabilized by the method of the present invention include melt-processable copolymers comprising at least two monomers selected from the group consisting of tetrafluoroethylene, hexafluoropropylene, perfluoroalkyl vinyl ethers, ethylene, vinylidene fluoride and chlorotrifluoroethylene; vinylidene fluoride homopolymer; chlorotrifluoroethylene homopolymer; and the like.

The perfluoroalkyl vinyl ethers include a vinyl ether of the formula:

$$CF_2=CFO(CF_2)_mF$$

wherein m is an integer of 1 to 6, and
a vinyl ether of the formula:

$$CF_2=CF(O-CF_2CF(CF_3))_nOC_3F_7$$

wherein n is an integer of 1 to 4.

In particular, when a fluorine-containing polymer, which is treated by the method of the present invention, is a tetrafluoroethylene-hexafluoropropylene copolymer (FEP), it preferably comprises 72 to 96 wt. % of tetrafluoroethylene and 4 to 28 wt. % of hexafluoropropylene. When a fluorine-containing polymer is a tetrafluoroethylene-perfluoroalkyl vinyl ether copolymer (PFA), it preferably comprises 92 to 99 wt. % of tetrafluoroethylene and 1 to 8 wt. % of a perfluoroalkyl vinyl ether. When a fluorine-containing polymer is a tetrafluoroethylene-ethylene copolymer (ETFE), it preferably comprises 74.5 to 89.3 wt. % of tetrafluoroethylene and 10.7 to 25.5 wt. % of ethylene.

These polymers may comprise other monomers in an amount such that the inherent properties of each copolymer do not deteriorate. Examples of the other monomers include hexafluoropropylene (when the fluorine-containing polymer does not comprise hexafluoropropylene), perfluoroalkyl vinyl ethers (when the fluorine-containing polymer does not comprise a perfluoroalkyl vinyl ether), ethylene (when the fluorine-containing polymer does not comprise ethylene), vinylidene fluoride (when the fluorine-containing polymer does not comprise vinylidene fluoride), and chlorotrifluoroethylene (when the fluorine-containing polymer does not comprise chlorotrifluoroethylene).

The melt processable fluorine-containing polymers are preferably prepared by emulsion or suspension polymerization. When the polymers are FEP, PFA, and copolymers of tetrafluoroethylene, hexafluoropropylene and a perfluoroalkyl vinyl ether, they have a melt viscosity in the range between 0.1 and 100 kpa.s at 372° C.

The method of the present invention is carried out preferably at a temperature in the range between 200 and 450° C.

The method of the present invention requires a residence time of at least 10 minutes to achieve the desired effects. When the residence time is less than 10 minutes, it is difficult to obtain a fluorine-containing polymer having sufficient heat stability and no coloring.

The kneader used in the method of the present invention may be a batch apparatus or a continuous apparatus, and preferably has good self-cleaning properties, and good piston flow properties in continuous operation. When these properties of the kneader are insufficient, it may take a long time for obtaining all the charged raw materials in the desired states.

The polymer is preferably discharged from the kneader in the continuous operation with a single-screw extruder which has a vent for removing gasses which are dissolved in the molten polymer.

For effectively removing the unstable end groups and unstable bonds in the backbones from the fluorine-containing polymers and improving the heat stability of the polymer, one or more of the following additional procedures may be combined with the above described fundamental conditions of the method of the present invention:

a) Supplying pure fluorine gas, or fluorine gas which is diluted to a suitable concentration, in a sufficient amount for removing all the unstable end groups into a kneader;

b) Supplying water or steam in a sufficient amount for removing all the unstable end groups into a kneader;

c) Adding salts or bases comprising alkali metals or alkaline earth metals, ammonia, amines or their salts, or alcohols to the fluorine-containing polymers, and then charging the polymer into a kneader;

d) Adding salts or bases comprising alkali metals or alkaline earth metals, ammonia, amines or their salts, or alcohols to the fluorine-containing polymers, prior to or during any step of the method of the present invention;

e) Allowing the fluorine-containing polymers in contact with inert gas for a sufficient time prior to the charging of the polymer in a kneader for removing substantially all the absorbed or adsorbed oxygen in the polymer, and then supplying the polymer in a kneader.

The treatment of the present invention can remove almost all the unstable end groups and unstable bonds in the backbones, and convert the unstable end groups to stable perfluoromethyl end groups ($-CF_3$), difluorohydride end groups ($-CF_2H$), acid amide end groups ($-CONH_2$) and methyl ester end groups ($-COOCH_3$).

The amount of unstable end groups and stable end groups can be quantitatively measured by infrared spectrometry. Such a measuring method is disclosed in U.S. Pat. Nos. 3,085,083 and 4,675,380, the disclosures of which are hereby incorporated by reference, and JP-A-4-20507. The number of end groups can be measured as the number per $10^6$ carbon atoms by this measuring method.

The amount of materials which volatilize during the melt processing of the polymers can be assayed by the measurement of a volatile index, that is, a VI value, which is known. The measuring method of a VI value will be explained below.

Ten grams of a polymer sample is charged in a heat resistant container, and placed in a glass vessel which is connected with a vacuum line.

The vessel is evacuated to a reduced pressure of 2 mmHg or less, and inserted in a high temperature block kept at 380° C. to achieve thermal equilibrium.

The pressure change is recorded every ten minutes over 60 minutes, and a VI value is calculated in accordance with the following formula:

$$VI=(P_{40}-P_0)\times V/10/W$$

wherein $P_0$ and $P_{40}$ are a pressure prior to the insertion in the high temperature block and a pressure after 40 minutes from the insertion in the high temperature block, respectively, V is the volume (ml) of the vessel, and W is the weight (g) of the sample.

The volatile index is preferably less than 25. When the volatile index is larger than 25, bubbles or voids, which cause troubles in the melt processing, may form.

The degree of coloring depends on the severity of melting conditions, residues of polymerization initiators, and presence of contamination. The main cause for the coloration is supposed to be carbon atoms which appear in the polymers at a temperature of 200° C. or higher. This supposition may be reasonable, since the degree of coloration has substantially perfect correlation with the number of unpaired electrons on the carbon atoms of the sample polymers, when the number of unpaired electrons on the carbon atoms of the sample polymers having different degrees of coloring is measured by ESR.

The polymers have substantially no coloring, when the number of unpaired electrons on the carbon atoms is between 0 and $1 \times 10^{14}$ spins/g, preferably $5 \times 10^{13}$ spins/g or less, in terms of a spin density, which is measured by ESR at 77K. The method of the present invention can easily achieve such a spin density level.

The method of the present invention can effectively remove the unstable end groups and unstable bonds in the backbone during melt kneading, and provide colorless fluorine-containing polymers while avoiding the complicated conventional method which comprises removing the unstable bonds in the backbones with a twin-screw extruder, and then removing unstable end groups with other equipment, as disclosed in U.S. Pat. No. 4,626,587.

Now, the present invention will be illustrated by the following examples.

EXAMPLE 1

A FEP powder, which had been prepared by emulsion polymerization using ammonium persulfate (APS), had a melt viscosity of 2.8 kPa.s, and contained 12 mole % of HFP, was treated as follows, and then the kinds and numbers of end groups of the obtained FEP, and a volatile index were measured.

The above FEP powder (1 kg) was charged in a surface renewal type kneader having an internal volume of 1 liter, a usable volume ratio of 0.82 and a power factor K of 225 ("BIBOLACK" manufactured by Sumitomo Heavy Machinery and Industries, Ltd.), and kneaded for 40 minutes at 380° C. and 50 rpm, while passing pure water at a rate of 2.0 g/min. and an air at a rate of 0.3 NL/min.

The obtained polymer was a milk-white one with transparency.

The kinds and amounts of the end groups and the volatile indexes (VI) of the FEP powder before and after the treatment are shown in Table 1. Almost all the unstable end groups were removed, and the volatile index was lower after the treatment.

The amount of unpaired electrons on the carbon atoms of the polymer after the above treatment is shown in Table 1 in terms of a spin density measured by ESR at 77K. The spin density was very low.

Substantially all the unstable end groups were removed, and also the volatile index (VI) was low.

EXAMPLE 2

FEP powder was treated in the same manner as in Example 1 except that the internal air of the kneader was thoroughly replaced with nitrogen gas after the charging of the FEP powder, no water was added during the treatment, and a fluorine gas which was diluted with nitrogen to a concentration of 7.6 mole % was passed at a rate of 0.3 NL/min. in place of air, and the treating period of time was 60 minutes.

After the treatment, the fluorine gas in the internal space of the kneader was thoroughly replaced with nitrogen gas, and then the content was discharged from the kneader. The FEP powder after treatment was milk-white.

The kinds and amounts of the end groups and the volatile indexes (VI) of the FEP powder before and after the treatment are shown in Table 1. Almost all the unstable end groups were removed, and the volatile index was lower after the treatment.

The amount of unpaired electrons on the carbon atoms of the polymer after the above treatment is shown in Table 1 in terms of a spin density measured by ESR at 77K. The spin density was very low.

TABLE 1

| | | Example 1 | | Example 2 | |
|---|---|---|---|---|---|
| | | Before treatment | After treatment | Before treatment | After treatment |
| End groups (groups/ $10^6$ C. atoms | —COF | 0 | | 0 | |
| | —COOH (m) | 131 | 2 | 131 | 3 |
| | —COOH (d) | 677 | 5 | 677 | 4 |
| VI | | >100 | 4.2 | >100 | 4.5 |
| Spin density (spins/g) | | — | $2.7 \times 10^{13}$ | — | $2.2 \times 10^{13}$ |

Comparative Example

The same FEP powder as one used in Examples 1 and 2 was pelletized with a single-screw extruder having a screw diameter of 50 mm and a L/D ratio of 30 at a cylinder temperature of 380° C. The pellets were fluorinated with fluorine gas, which had been diluted with nitrogen gas to a concentration of 7.6 mole %, in an autoclave at 185° C. The volatile index was measured with varying the fluorination time. The results are shown in Table 2.

It is found that the fluorination time of about 8 hours is necessary for achieving a volatile index of 25 or less.

The amount of unpaired electrons on the carbon atoms of the polymer just after the extrusion was as high as $4.5 \times 10^{15}$ spins/g in terms of a spin density measured by ESR at 77K.

TABLE 2

| Fluorination time (hrs) | VI |
|---|---|
| 0 | 48 |
| 2 | 35 |
| 3 | 29 |
| 6 | 26 |
| 8 | 23 |

What is claimed is:

1. A method for improving the thermal stability of a fluorine-containing polymer comprising melt kneading a melt-processable fluorine-containing polymer with a kneader which has a residence time of at least 10 minutes, a usable volume ratio based on usable space in a container/space in a container, said usable volume ratio being larger than 0.3, and a power factor K of less than 8000, the power factor K being represented by the formula:

$$K = Pv/\mu/n^2$$

wherein Pv is a power requirement per unit volume (W/m³), $\mu$ is a melt viscosity (Pa.s), and n is a rotation speed (rps) wherein said fluorine-containing polymer is a copolymer comprising at least two monomers selected from the group consisting of tetrafluoroethylene, hexafluoropropylene, perfluoroalkyl vinyl ethers, ethylene, vinylidene fluoride and chlorotrifluoroethylene;
vinylidene fluoride homopolymer; or
chlorotrifluoroethylene homopolymer
wherein water or steam is supplied in sufficient amount to remove any unstable end groups.

2. A method according to claim 1, wherein said kneader is a twin screw type kneader and has a self-cleaning mechanism and piston flow properties.

3. A method according to claim 1, wherein said melt-processable fluorine-containing polymer is one prepared by emulsion or suspension polymerization, and the amount of unpaired electrons on the carbon atoms of said polymer is reduced to $1 \times 10^{14}$ spins/g in terms of a spin density measured by ESR at 77K.

4. A method according to claim 1, wherein said fluorine-containing polymer is a copolymer of tetrafluoroethylene and hexafluoropropylene, a copolymer of tetrafluoroethylene and a perfluoroalkyl vinyl ether, or a copolymer of tetrafluoroethylene, hexafluoropropylene and a perfluoroalkyl vinyl ether, and has a melt viscosity in the range between 0.1 and 100 kPa.s at 372° C.

5. A method according to claim 1, which further comprises contacting said fluorine-containing polymer with inert gas for a sufficient time to remove substantially all the absorbed or adsorbed oxygen in said fluorine-containing polymer, prior to the supply of water or steam.

* * * * *